(12) United States Patent
Kerr et al.

(10) Patent No.: US 10,402,486 B2
(45) Date of Patent: Sep. 3, 2019

(54) DOCUMENT CONVERSION, ANNOTATION, AND DATA CAPTURING SYSTEM

(71) Applicant: LAWPRCT, Inc., Atlanta, GA (US)

(72) Inventors: Jeff Kerr, Atlanta, GA (US); Hunter Clarke, Atlanta, GA (US)

(73) Assignee: LAWPRCT, Inc., Atlanta, GA (US)

( * ) Notice: Subject to any disclaimer, the term of this patent is extended or adjusted under 35 U.S.C. 154(b) by 0 days.

(21) Appl. No.: 15/433,390

(22) Filed: Feb. 15, 2017

(65) Prior Publication Data

US 2018/0232348 A1  Aug. 16, 2018

(51) Int. Cl.
*G06F 17/24* (2006.01)
*G06F 17/21* (2006.01)
*G06F 17/22* (2006.01)

(52) U.S. Cl.
CPC ........ *G06F 17/241* (2013.01); *G06F 17/211* (2013.01); *G06F 17/2235* (2013.01); *G06F 17/2264* (2013.01)

(58) Field of Classification Search
CPC .................. G06F 17/211; G06F 17/241
USPC .................. 715/230, 231, 232, 255, 256
See application file for complete search history.

(56) References Cited

U.S. PATENT DOCUMENTS

| | | | | |
|---|---|---|---|---|
| 6,085,185 | A * | 7/2000 | Matsuzawa | G06F 17/30017 |
| 7,483,983 | B1 * | 1/2009 | Bonefas | H04L 67/2823 |
| | | | | 709/226 |
| 7,752,542 | B2 * | 7/2010 | Cragun | G06F 17/30923 |
| | | | | 715/234 |
| 7,797,622 | B2 * | 9/2010 | Dejean | G06K 9/00469 |
| | | | | 715/230 |
| 8,700,682 | B2 * | 4/2014 | Tedder | G06F 17/3089 |
| | | | | 707/809 |
| 2002/0055928 | A1 * | 5/2002 | Worthington | G06F 8/36 |
| 2003/0046318 | A1 * | 3/2003 | Schohn | G06F 17/2229 |
| | | | | 715/255 |
| 2003/0050927 | A1 * | 3/2003 | Hussam | G06F 17/30696 |
| 2004/0194021 | A1 * | 9/2004 | Marshall | G06F 17/241 |
| | | | | 715/232 |
| 2005/0108233 | A1 * | 5/2005 | Metsatahti | G06F 16/94 |
| 2006/0161838 | A1 * | 7/2006 | Nydam | G06F 17/241 |
| | | | | 715/202 |
| 2007/0055933 | A1 * | 3/2007 | Dejean | G06F 17/2264 |
| | | | | 715/234 |
| 2007/0226610 | A1 * | 9/2007 | Da Silva | G06F 17/2247 |
| | | | | 715/234 |
| 2009/0132907 | A1 * | 5/2009 | Shao | G06F 17/2247 |
| | | | | 715/234 |
| 2010/0185933 | A1 * | 7/2010 | Coffman | G06Q 10/10 |
| | | | | 715/230 |

(Continued)

OTHER PUBLICATIONS

Basic Legal Citation; Dec. 30, 2016; Cornell University Law School, pp. 1-41.*

*Primary Examiner* — Andrew R Dyer
(74) *Attorney, Agent, or Firm* — Lee & Hayes, P.C.

(57) ABSTRACT

A document annotation system receives a document in an original format including content. The system converts the document to an intermediate format including page data elements representing pagination within the document. The system converts the intermediate format to a display format including data marker elements linking a portion of the content to a pin cite based on the page data elements. The system detects annotations to the display format and generates citations based on the annotations.

20 Claims, 9 Drawing Sheets

(56) References Cited

U.S. PATENT DOCUMENTS

| | | | |
|---|---|---|---|
| 2010/0241947 A1* | 9/2010 | Dahn | G06F 17/30637 715/233 |
| 2010/0313114 A1* | 12/2010 | Colbran | G06F 17/2247 715/230 |
| 2012/0328259 A1* | 12/2012 | Seibert, Jr. | G06F 17/212 386/230 |
| 2013/0249917 A1* | 9/2013 | Fanning | G06T 11/206 345/440 |
| 2013/0332804 A1* | 12/2013 | Seaman | G06F 17/243 715/201 |
| 2014/0250361 A1* | 9/2014 | Wineman | G06F 17/2247 715/234 |
| 2014/0281895 A1* | 9/2014 | Tay | G06F 17/212 715/234 |
| 2017/0110156 A1* | 4/2017 | Markan | G06F 3/0488 |
| 2017/0147758 A1* | 5/2017 | Gupta | G06Q 10/10 |

\* cited by examiner

Fact
@QuickTalk sends content messages via broadcast — 415

+ Create new contact/entity — 420

Date
April 1, 2013 — 425

Time — 430

Pin Cite
at 12 — 435

Issues
x Infringement – Claim 1 element 2 — 440
445

+ Create new issue — 450

Source Text
Nodes send Content Messages via a broadcast scheme. — 455

Delete    Save
460        465 all communication between nodes in the network is done using messages. Each Content Message, i.e., message containing content has the following format:

TARGET_ID, 2 bytes
SENDER_ID, 2 bytes
MESSAGE_TYPE, 2 bytes
MESSAGE_ID, 2 bytes
MESSAGE_LENGTH, 2 bytes
MESSAGE_CONTENT, variable based on MESSAGE_LENGTH
CHECKSUM, 1 byte When a target node receives the message, it will respond with a simple ACK message, which has a MESSAGE_TYPE of 0xFF. An ACK message has no content, and therefore has the following format:

TARGET_ID, 2 bytes (sender of the content message)
SENDER_ID, 2 bytes (recipient of the content message)
MESSAGE_TYPE, 2 bytes, 0xFF
MESSAGE_ID, 2 bytes
MESSAGE_LENGTH, 0x00
MESSAGE_CONTENT, null
CHECKSUM, 1 byte Nodes send Content Messages via a broadcast scheme. ACK messages are sent via a unicast scheme.

12

DOCUMENT CONVERSION, ANNOTATION, AND DATA CAPTURING SYSTEM

BACKGROUND

In some industries, document management may be necessary to organize large volumes of documents that include content supporting facts associated with various issues. Such industries can include, for example, the legal industry, engineering, research and development, journalism, and education. A conventional document management system may provide a way to catalog documents, manage version control of the documents, and/or archive documents. For example, in the legal industry, a conventional document management system may store documents obtained during discovery and may provide functionality to legal practitioners to search the documents based on their content, author, or date of creation, custodian, and the like. Some conventional document management systems allow users to provide notes or comments regarding the documents or to mark the documents as belonging to a category. For example, in the journalism industry, a user may be able to provide a summary of a document and mark the document as relating to an issue (e.g., government spending) or associated with a confidential source (e.g., Deep Throat).

In conventional document management systems, documents are generally stored in their original or native formats. Some conventional document management systems may provide document viewers where an image of the document may be available without opening the original or native format of the document. In some conventional document management systems, a user can annotate a document by checking the document out of the system, opening the document in an application configured to edit the document (e.g., opening a .doc file in MICROSOFT WORD), and checking the document back into the system. In such systems, the annotations become integrated with the document and are generally not separable without individual modification of each document. The disclosure made herein is presented with respect to these and other considerations.

In other conventional document management systems, users can annotate images of the documents, but these annotations are not linked or associated with content of the document. For example, a user may be able to annotate portions of a document by highlighting a portion of the document's corresponding image in the conventional document management system's viewer, but the content that is the subject of the annotation is not extracted or linked to the original or native document. In addition, the annotation is not linked to the location in the original or native document corresponding to the annotated portion of the image.

Providing functionality for a conventional document management system may include several technical challenges. For example, each document managed by the document management system may be of a different type with proprietary structures and encoding. When conventional document management systems provide a common document viewer, the different formats may require extensive processing leading to slower response time and extensive consumption of resources such as CPU cycles, memory, power, and the like.

BRIEF DESCRIPTION OF THE DRAWINGS

FIG. 4 shows an example document annotation user interface consistent with disclosed embodiments.

DETAILED DESCRIPTION

Figure 1:
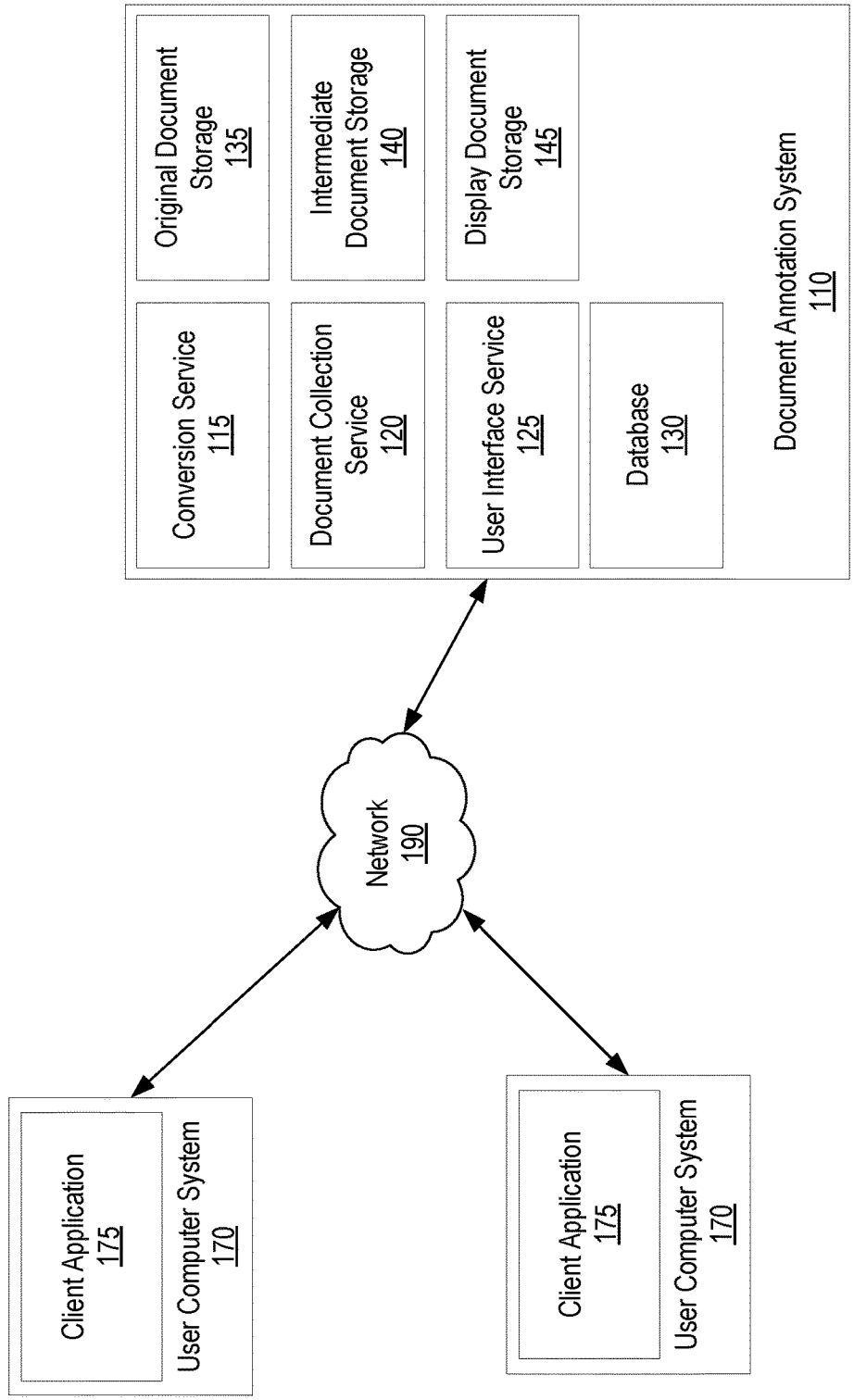
FIG. 1 shows a document annotation system consistent with disclosed embodiments.

The present disclosure describes embodiments of a document annotation system where annotations performed on a display version of the document are linked to locations within the original or native document. For example, in some embodiments, the document annotation system renders a document in a display format. A user can be provided with tools to annotate the document in the display format. The document management system can link the annotations made to the display format version of the document to a location within the original document. By linking the annotations to locations within the original document, the document management system can generate citations corresponding to the annotation. The citations can later be used in reports, articles, or legal filings.

In some embodiments, the document annotation system manages issues, facts, and entities related to a case or matter for which documents are being managed. An issue, in some embodiments, may be a topic, problem, or subject that is of importance to the users of the document annotation system. For example, if legal practitioners are using embodiments of the document annotation system for a litigation, issues can include legal issues that are the subject of the litigation, such as negligence or infringement. A fact, in some embodiments, is a statement of something that has occurred that may be related to an issue. For example, facts can include the time, place, and attendees of a meeting, the date and address of an event, or the actions of a person. An entity, in some embodiments, can include persons, corporations, tangible property, and intellectual property, as just some examples. According to some embodiments, the document management system can provide a user interface for a user to link a citation from a document to an issue, fact, and/or entity.

Different organizations may use different applications in the ordinary course of business. For example, some organizations may use the WORD word processing application from MICROSOFT CORPORATION for documents and the POWERPOINT presentation application, also from MICROSOFT CORPORATION, for presentations while other organizations may use the WORDPERFECT word processing application from COREL CORPORATION for documents and the KEYNOTE presentation application from APPLE, INC. for presentations. As a result, in some embodiments, the document annotation system can be configured to accept and manage documents that are stored in a plurality of differing original formats. For example, the document annotation system can accept, in some embodiments, image formats (e.g., JPEG, GIF, TIFF, etc.), word processing formats (e.g., .DOC, .DOCS, .WPD, .ODT, .OTT, .TXT, etc.), presentation formats (e.g., .PPT, .KEY, .OPD, .SDA, etc.), spreadsheet formats (e.g., .XLS, .CSV, .SDC, .ODS, .WKS) and other types of formats (e.g., .PDF, HTML, XML, source code file types, etc.), as just some examples.

The ability to manage and accept documents of different types, display them in a common interface, and generate citations to the documents based on user annotations presents several technical challenges. One challenge, for example, is that each file type may have a proprietary structure or encoding. To display these documents in a common view, the document management system will need to parse and interpret each supported file type. This may require dedicated code, components, or modules for each file supported type, which increases the complexity of the code base for the document annotation system. Increased complexity can lead to more errors, increased maintenance expense for developers, increased computation time, and greater integration problems. Increased complexity can also lead to a higher defect rate within the code base, which can cause user frustration due to errors.

Another technical challenge, for example, relates to displaying documents of different file types in a common viewer. Some document formats may require more extensive processing to be displayed in a common viewer. For example, spreadsheet documents may require more processing for display than a word processing or plain text document. Some conventional document management systems use a native file viewer plug-in for each file type, but loading native file viewers can increase resource needs (such as processing and memory requirements), which can lead to slower response times for loading and displaying documents. For example, when a user is viewing documents of many different file types in a conventional document management system, a native file viewer would need to be loaded and instantiated every time the user views a file of a different file type. The processing required to load the native file viewer and load the document into the native file viewer may cause frustration to the user due to slow response times.

The use of native file viewers can also create technical problems related to annotations of stored documents—each native file viewer may apply annotations to the document using the native file type's encoding. When attempting to view citations across annotations of different types, processing time can increase as the document management system may need to inspect each individual file and extract the annotations.

While conversion of the original, native file type of a document to a common display type may be one solution the problems described above, such conversion may lead to other technical challenges. One such challenge is maintaining the original pagination and/or structure of the original document when rendering the document. Maintaining the pagination of the document is important when generating citations based on annotations—the citations may include a pin cite or page number, and if the pagination of the document is altered or lost when converted to a display format, the pin cites of citations generated by the document annotation system may not correlate with the pin cites of the original document.

To address these problems, in some embodiments, the document annotation system may perform a process whereby documents are received in their original formats, which may vary from document to document. The document annotation system may generate copies of documents, but in a common intermediate format that preserves its content. The common intermediate format may be converted to a display format. The display format may include the content of the documents, data indicating the pagination of the document, and additional code instructions for rendering the document within a document viewer. When the document annotation system detects annotation user actions to the display format (e.g., highlight of text), the document annotation system can generate a citation based on the pagination data injected into the display format and the content at the location of the detected annotation user action.

In some embodiments, the intermediate format may be a format to which a plurality of file formats is commonly converted. For example, in some embodiments, the intermediate format can be Portable Document Format (PDF). By first converting original documents to a common intermediate format before converting the documents to a display format, the document annotation system can reduce the complexity associated with supporting a variety of file types while at the same time preserving pagination.

In one non-limiting use case for discussion purposes, the document annotation system may receive from a user a first document in .doc file format, a second document in .wpd format, a third document in .ppt format, and a fourth document in .wks format. The document annotation system may generate copies of the first, second, third, and fourth documents in PDF format, an intermediate format in this example. The document annotation system may then generate copies of the PDF versions of the first, second, third, and fourth documents to HTML files, a display format in this example. The HTML versions of the first, second, third, and fourth documents may include data marker elements that correspond to the pages of the PDF versions of the documents. In some embodiments, event listeners can be added to the HTML document (e.g., using JavaScript) to listen for events on each content node that listen for events indicating selection of content within the content node, such as mouse down, mouse move, and mouse up events. The event handlers for these event listeners may identify the selected content and traverse the HTML until it encounters a data marker element representing the pin cite or page for the selected content. The document annotation system may then generate a citation including the selected content and pin cite.

In some embodiments, when the document annotation system renders the display format of documents, it may access instructions for displaying past annotations of the document so that when the document is displayed within the system, users can view past annotations. For example, at a first time a user may highlight a sentence in a document, create a citation, and save the citation and highlight. At a second, later time, the user may request that the document annotation system display the document. Before rendering the document from its display format, the document annotation system may access past annotations, including the citation and highlight from the first time. When the document annotation system renders the document, the highlight will be visible to the user along with information about the citation, such as the page and text of the citation.

According to some embodiments, the document annotation system operates in conjunction with a network-based distributed execution environment in which operators of the document annotation system can purchase, configure, and utilize computing resources, such as virtual machine instances, data storage resources, networking resources, and database resources, on a permanent or as-needed basis. In some embodiments, the network-based distributed execution environment may offer computing resources for purchase and use in various configurations. For example, the distributed execution environment might offer virtual machine instances available for purchase and use that have many different configurations of processor capabilities, main memory, disk storage, and operating system. An operator of the document annotation system might create, configure, and deploy various combinations of computing resources provided by the network-based distributed execution environment to create "solutions" that provide various types of functionality, such as application hosting, backup and storage, content delivery, Web hosting, enterprise IT solutions, database services, and others.

The subject matter presented herein may be implemented as a computer process, a computer-controlled apparatus, a computing system, or an article of manufacture, such as a computer-readable storage medium. While the subject matter described herein is presented in the general context of modules, components, or processes that execute on one or more computing devices, other implementations may be performed in combination with other types of program modules, components, or processes. Moreover, the functionality performed by one or more of the disclosed modules, components, or processes may be performed by other disclosed modules, components, or processes without departing from the spirit and scope of disclosed embodiments. Generally, program modules include routines, programs, components, data structures, and other types of structures that perform particular tasks or implement particular abstract data types.

Aspects of the subject matter described herein may be practiced on or in conjunction with other computer system configurations beyond those described, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 illustrates, in block form, system 100 for storing and annotating documents. In the embodiment illustrated in FIG. 1, document annotation system 110 can communicate with one or more user computer system(s) 170 using network 190. System 100 outlined in FIG. 1 can be computerized, wherein each of the illustrated components comprises a computing device that is configured to communicate with other computing devices via network 190. For example, document annotation system 110 can include one or more computing devices, such as a desktop, notebook, or handheld computing device that is configured to transmit and receive data to/from other computing devices via network 190.

In some embodiments, document annotation system 110 can include a server, server cluster, and/or a distributed execution environment. For example, document annotation system 110, can include one or more servers or computing clusters, or one or more data centers consistent with disclosed embodiments. Similarly, user computer system 170 can include one or more computing devices such as a desktop, notebook, or handheld computing device that is configured to transmit and receive data to/from other computing devices via network 190. In some embodiments, these computing systems can be implemented using one or more computing devices dedicated to performing the respective operations of the systems as described herein.

Depending on the embodiment, network 190 can include one or more of any type of network, such as one or more local area networks, wide area networks, personal area networks, telephone networks, and/or the Internet, which can be accessed via any available wired and/or wireless communication protocols. For example, network 190 can comprise an Internet connection through which document annotation system 110 and user computer system 170 communicate. Any other combination of networks, including secured and unsecured network communication links are contemplated for use in the systems described herein.

In some embodiments, system 100 can include document annotation system 110. Document annotation system 110 can perform one or more operations related to annotating documents such as collecting documents, generating user interfaces displaying collected documents, generating user interface elements that when selected by a user provide annotation information concerning documents, and/or any data processing related to managing, displaying, or annotating documents. According to some embodiments, document annotation system 110 can include various services for performing its operations. The services may execute within a distributed execution environment, such as a cloud computing environment or a virtual computing environment. According to some embodiments, document annotation system 110 can include conversion service 115, document collection service 120, user interface service 125, and database 130. Document annotation system 110 can also include or interface with services for storing documents. For example, document annotation system 110 can include original document storage 135, intermediate document storage 140, and display document storage 145.

In some embodiments, document annotation system 110 provides operations and functions in a client-server architecture. Document annotation system 110 can provide operations and functions related to user interactions through an application executing on a remote client device. For example, as shown in FIG. 1, user computer system 170 can execute client application 175. Client application 175 can perform operations and functions for rendering user interfaces to display on user computer system 170 and obtain information from users regarding the rendered user interfaces, such as the location and content of annotations to rendered documents. Client application 175 may include a browser-based application that executes within a web browser, or client application 175 may include an executable or application that executes separately from a web browser.

According to some embodiments, document annotation system 110 can provide instructions to client application 175 for rendering user interfaces on user computer system 170. As described herein, generating user interfaces can include creating code or instructions for rendering user interfaces or executing or interpreting code or instructions for rendering user interfaces.

Document annotation system 110 can also perform operations and functions related to data management, document storage, and document format transformation which may be performed on a server, server cluster, or within a data center consistent with disclosed embodiments. For example, as shown in FIG. 1 document annotation system 110 can perform services related to converting documents, collecting documents, storing documents, and generating code and instructions for rendering user interfaces on a computer system that is remote from, and in communication with, document annotation system 110, such as user computer system 170.

According to some embodiments, document annotation system 110 can include conversion service 115. Conversion service 115 can perform functions and operations for converting the format of documents stored and managed by document annotation system 110. For example, conversion service may include one or more libraries for converting a document stored in a DOC file format into a document stored in a PDF format. According to some embodiments, conversion service 115 can perform operations to convert documents of various formats into a common intermediate format, and convert documents in the common intermediate format into a common display format, which can be interpreted by client application 175 to render the document within a user interface. For example, conversion service 115 can convert word processing documents, spreadsheet documents, presentation documents, and image documents into PDF (e.g., a common intermediate format in this example). Conversion service 115 can also convert documents stored as PDF into HTML or some other document format (such as a serialized object) that provides instructions for rendering text and images within a user interface.

According to some embodiments, conversion service 115 can add or append data to converted document formats to preserve pagination of the original document. For example, when converting documents from a common intermediate format into a display format, conversion service 115 may include one or more data marker elements corresponding to page numbers of the document in common intermediate format or its original format. In some embodiments, conversion service 115 can add or append one or more page data elements within the common intermediate format representing page numbers or beginning and of pages of the document when it is in its original document format. The one or more data elements can include, for example, metadata, attributes for a text node within a tree-structured document object model, or other attributes corresponding to content of the document. In one embodiment, the common intermediate format and/or the display format can include a hierarchal document object model with a tree structure where pages are nodes within the tree, and content on pages are child nodes of the pages.

According to some embodiments, documentation annotation system 110 can include document collection service 120. Document collection service 120 can perform functions and operations related to the collection of documents from user computer system 170 or other document sources. For example, a user may wish to add a document to the document annotation system 110. Client application 175 may render a user interface providing a file chooser user interface element the user can manipulate to select one or more files from the file system of user computer system 170. When client application 175 detects a user action consistent with a command to upload a document to document annotation system 110, client application 175 may interface with document collection service 120 to transfer a copy of the document from user computer system 170 to document annotation system 110.

Document collection service 120 can, for example, use an FTP service to receive documents, or may open one or more network sockets for accepting data streams transferring documents from client application 175. According to some embodiments, document collection service 120 can perform additional operations related to document collection such as generating unique identifiers for collected documents, storing collected documents, and communicating collected documents to other services within document annotation system 110.

Document annotation system 110 can also include user interface service 125 in some embodiments. User interface service 125 can perform functions and operations for generating code and instructions for rendering user interfaces. For example, user interface service 125 may generate code or instructions which can be read by client application 175 to render user interfaces for collecting documents, annotating documents, or presenting information about documents stored within the document annotation system 110. The user interfaces can include one or more user interface elements that are responsive to user actions. For example, services may include buttons that when pressed perform certain actions, or other manipulatable user interface elements that cause changes within the user interface based on detected user actions. Some examples of user interfaces generated by user interface service 125 are described below with respect to FIGS. 4 and 5.

In some embodiments, document annotation system 110 can include database 130. Database 130 can include data concerning the management of documents stored within document annotation system 110. Database 130 can also include for example, data for providing access to document annotation system 110 or the documents document annotation system 110 stores. For example, database 130 may include user tables and permission tables that specify which users of document annotation system 110 have permission to view or annotate documents stored by document annotation system 110.

In some embodiments, database 130 can store an access key, security key, or other security data element used by user computer system 170 to provide access to user interfaces and documents provided by document annotation system 110. The access key or security key may be provided to client application 175 when client application 175 is installed on user computer system 170. In some embodiments, the access key or security key is provided by document annotation system 110 to client application 175 when client application 175 is launched on user computer system 170, or a user logs in to document annotation system 110 via a login user interface provided by client application 175.

In some embodiments, a security data element (corresponding to the security key) may be included in the display format of documents that are provided to client application 175. In such embodiments, client application 175 may compare the access or security key it received upon installation or login with the security data element in the document format it receives from user interface service 125. When the access key or security key matches the security data element, client application 175 may interpret the code or instructions received from user interface service 125 to render one or more user interfaces on user computer system 170 and render the document in its display format. When the access key or security key does not match the security data element, client application 175 may prevent rendering of user interfaces received from user interface service 125 or may display an error or warning in some embodiments.

In some embodiments, database 130 can also include data concerning issues, facts, or entities related to the case or matter for which document annotation system 110 is managing documents. For example, user interface service 125 may generate a user interface that client application 175 renders on user computer system 170 to obtain text identifying issues or facts pertaining to content within documents stored by document annotation system 110. The user interface can include for example a text field for entering text concerning the fact, a text field or drop-down menu for an issue, and the like.

When client application 175 detects a user action consistent with saving a fact, issue, or an entity, client application 175 may transmit the user entered information to user interface service 125 which then communicates with database 130 to store it. In some embodiments, user interface service 125 collects data concerning issues, facts, or entities relating to one or more documents for which it is generating a user interface. For example, when user interface service 125 is generating a user interface for displaying an email concerning a meeting time, user interface service 125 may collect data from database 130 concerning entities (e.g., people attending the meeting), facts (e.g. the subject of the meeting and action items coming out of the meeting), and issues (e.g. indemnification).

Document annotation system 110 can also include or interface with one or more storage systems for documents. As shown in FIG. 1, document annotation system 110 can include original document storage 135 for storing original versions of documents collected by document collection service 120, intermediate document storage 144 for storing documents converted by conversion service 115 to a common intermediate format, and display document storage 145 for storing versions of documents that have been converted by conversion service 115 to display format.

In some embodiments, documents may be stored in different formats, the document can be identified within document annotation system 110 using a unique identifier. For example, document collection service 120 may collect an email and assign it unique identifier 12345. Document collection service 120 may store the email in its original format and original document storage 135 and create a data entry in database 130 indicating that the email has a unique identifier 12345. When conversion service 115 converts the email to an intermediate format, such as PDF, the conversion service may add to database 130 a link to the document intermediate format and unique identifier 12345.

In some embodiments, conversion service 115 may create an intermediate identifier and store it in database 130, and database 130 may establish a link between the unique identifier (for the original document) and the intermediate identifier (for the document in intermediate format). In some embodiments, when conversion service 115 converts the intermediate format to display format, it will link the document in display format to unique identifier 12345. Conversion service 115 can also create an display identifier and store it in database 130, and database 130 may establish a link between the unique identifier (for the original document) and the display identifier (for the document in display format). In some embodiments, conversion service 115 may use the unique identifier in the file name for the document. For example, conversion service 115 may rename the document using the unique identifier before storing the original format document in original document storage 135, and may use the unique identifier when generating the intermediate format document and the display format document.

Figure 2:
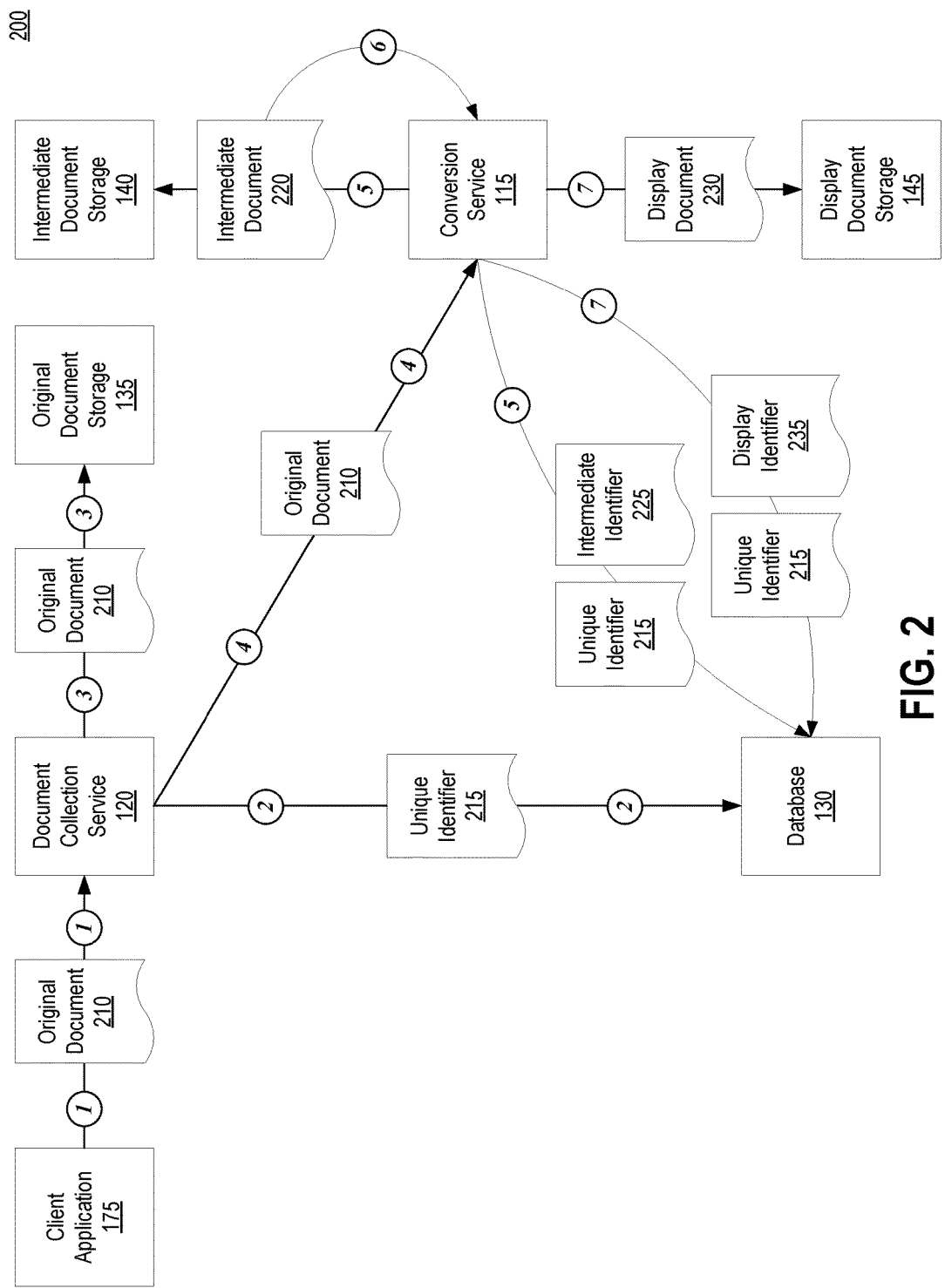
FIG. 2 is a data flow diagram for a document conversion process consistent with disclosed embodiments.

FIG. 2 illustrates data flow diagram 200 showing the flow of data for document conversion through documentation annotation system 110 according to one embodiment. While data flow diagram 200 shows one example of the flow of data for document conversion through document annotation system 110, some embodiments of document annotation system 110 may have different data flows than what is shown in data flow diagram 200 without departing from the spirit and scope of disclosed embodiments.

As shown in FIG. 2, client application 175 can provide original document 210 to document collection service 120 (flow path 1). When document collection service 120 receives original document 210 it creates unique identifier 215 and stores unique identifier 215 in database 130 (flow path 2). As mentioned above, unique identifier 215 can be used by document annotation system 110 to identify original document 210 and can be used to link to converted versions of original document 210. In some embodiments, document collection service 120 stores original document 210 in original document storage 135 (flow path 3).

In some embodiments, document collection service 120 may rename original document 210 using unique identifier 215. For example, if original document 210 is named "list.DOC" document collection service 120 may generate "9876" as the unique identifier and rename original document 210 as "9876.DOC" before storing original document 210 in original document storage 135. According to some embodiments, document collection service 120 may store the name of original document 210 along with the unique identifier 215 in database 130. Using the example above, document collection service 120 may store "list.DOC" along with "9876."

In some embodiments, document collection service 120 may send original document 210 to conversion service 115 (flow path 4). As described above, conversion service 115 may perform functions and operations to transform original document 210 into intermediate document 220. Intermediate document 220 can include the same content as original document 210, but in a format that different than the original format of original document 210. For example, original document 210 may be a text file having content of ASCII characters, and intermediate document 220 may include the same content as an original document 210 but formatted as a PDF file. Conversion service 115 can include various libraries for transforming documents from the original format to the intermediate format. As just one example, conversion service 115 may include a plurality of libraries that can output PDF files when given a document in a particular format. The particular format may be specific to an application. For example, the particular format can include image formats (image formats (e.g., JPEG, GIF, TIFF, etc.), word processing formats (e.g., .DOC, .DOCS, .WPD, .ODT, .OTT, .TXT, etc.), presentation formats (e.g., .PPT, .KEY, .OPD, .SDA, etc.), spreadsheet formats (e.g., .XLS, .CSV, .SDC, .ODS, .WKS) and other types of formats (e.g., PDF, HTML, XML, source code file types, etc.).

Conversion service 115 can, in some embodiments, identify the format of original document 210 and invoke an appropriate library for transforming original document 210 into intermediate document 220 while preserving the content and pagination of original document 210. Conversion service 115 may identify the format of original document 210 using the file extension of original document 210, or by analyzing the format of original document 210 and comparing it to document structures of format types for which conversion service 115 has a library. In some embodiments, conversion service 115 can analyze metadata included in, or associated with, original document 210 to identify the original format for original document 210.

Once conversion service 115 identifies the appropriate library for converting original document 210 to intermediate document 220 it may execute one or more APIs of the appropriate library to transform original document 210 to intermediate document 220 Conversion service 115, in some embodiments, may store intermediate document 220 in intermediate document storage 140 (flow path 5). In some embodiments, conversion service 114 also stores unique identifier 215 and intermediate identifier 225 in database 130 (flow path 5). As discussed above, unique identifier 215 identifies original document 210 and the generated intermediate identifier 225 may include an identifier that identifies intermediate document 220. When conversion service 115 stores unique identifier 215 and intermediate identifier 225 in database 130, database 130 may establish a link between unique identifier 215 and intermediate identifier 225 to store a relationship showing that original document 210 and intermediate document 220 contain the same content.

In some embodiments, after conversion service 115 transforms original document 210 to intermediate document 220 it may consume intermediate document 220 (flow path 6) to transform intermediate document 220 to display document 230 (flow path 7). Display document 230 can contain the same content as original document 210 and intermediate document 220 but display document 230 is in a display format that is a different format than original document 210 and intermediate document 220. The display format of display document 230 can include instructions and/or code for rendering the contents of original document 210 within a user interface, such as a user interface rendered by client application 175. In some embodiments, the display format includes a markup language capable of being interpreted by a browser, such as HTML, and any executable code for detecting and processing user actions.

In some embodiments, the display format includes a hierarchal document object model. The display format may also include objects streams, serialized objects, ASCII text, or binary that when interpreted by client application 175 instructs client application 175 to generate code or instructions causing user computer system 170 to display graphics consistent with the format and content of original document 210 (via the format and content of intermediate document 220).

According to some embodiments, conversion service 115 may store unique identifier 215 (corresponding to original document 210) and display identifier 235 (corresponding to display document 230) in database 130 (flow path 7). When conversion service 115 provides unique identifier 215 and display identifier 235 to database 130, database 130 may establish a relationship such that unique identifier 215 and display identifier 235 correspond, indicating that the content of original document 210 is the same as the content of display document 230. In some embodiments, conversion service 115 may store display document 230 in display document storage 145 (flow path 7).

Figure 3:
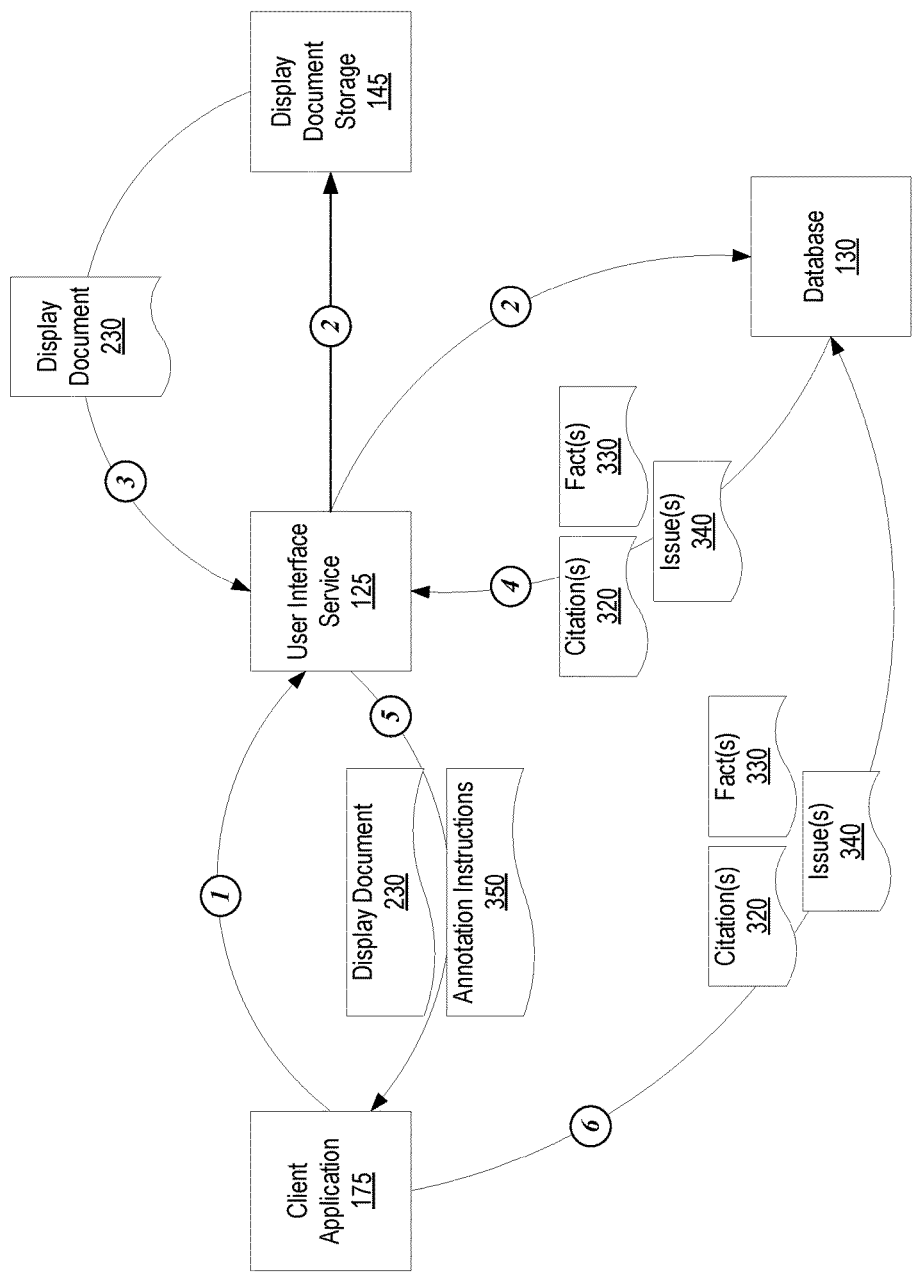
FIG. 3 is a data flow diagram for presenting and capturing document annotations consistent with disclosed embodiments.

FIG. 3 illustrates data flow diagram 300 showing the flow of data for document annotation through documentation annotation system 110 according to one embodiment. While data flow diagram 300 shows one example of the flow of data for document conversion through document annotation system 110, some embodiments of document annotation system 110 may have different data flows than what is shown in data flow diagram 300 without departing from the spirit and scope of disclosed embodiments.

As shown in FIG. 3, client application 175 may send a request to user interface service 125 to obtain code or instructions for rendering a document on user computer system 170 (flow path 1). According to some embodiments, a user action may trigger the request. For example, client application 175 may include a user interface element for searching documents stored within document annotation system 110 and for selecting one of those documents for display. The request may include, for example, a unique identifier identifying the document, the document name, search parameters for documents satisfying the search criteria (e.g., based on content or metadata), or other information that can be used to identify one or more documents stored by document annotation system 110.

Responsive to receiving the request, user interface service 125 may request the appropriate display document 230 satisfying the request from display document storage 145 (flow path 2). User interface service 125 may also query database 130 for any information related to the requested document (flow path 2). For example, user interface service 125 may query database 130 for citations 320, facts 330, and/or issues 340 corresponding to the requested document. The citations 320, facts 330, and issues 340 may have been stored in database 130 responsive to information provided by client application 175 on a previous occasion. For example, display document 230 may have been accessed at a first time, displayed by client application 175, and a user may have annotated display document 230 resulting in the generation of a citation. The citation may have been stored in database 130 by user interface service 125.

When client application 175 requests display document 230 at a second time, the citation may be retrieved by user interface service 125 from database 130. After user interface service 125 receives display document 230 from display document storage 145 (flow path 3) and citations 320, facts 330 and issues 340 from database 130 (flow path 4), user interface may provide display document 230 to client application 175 along with annotation instructions 350 (flow path 5). Display document 230, as described above, may include code or instructions enabling client application 175 to render the content of an original document provided to document annotation system 110.

In some embodiments, annotation instructions 350 can include instructions for rendering annotations on display document 230 when display document 230 is rendered by client application 175. The annotations can be rendered in an annotation style that is different from the default style of display document 230. For example, the default style of display document 230 may include black text and the annotation style can include highlights, notes, underlining, or other markup that can alter visual appearance of the content display document 230 or be graphically layered on top of the rendering of display document 230. The annotation style may be different than the default style of display document 230 to enable visual cues showing the location and nature of the annotations.

In some embodiments, annotation instructions 350 can include instructions specifying the type of annotation (e.g., highlighting) and the location of the annotation within display document 230. In some embodiments, the location of the annotation corresponds to a node within a document model specified by display document 230. For example, display document 230 may include HTML with five tags representing five paragraphs within display document 230. Annotation instructions 350 can include specification that the third tag corresponding to the third paragraph has an annotation beginning at character fifteen of the text within the third tag and lasting for thirty characters. Similarly, annotation instructions 350 can include a specification that the third node corresponding to the third paragraph has annotation beginning character fifteen of and ending at character forty-five.

In some embodiments, the annotation instructions 350 can be included within the version of display document 230 that user interface service 125 provides to client application 175. For example, if display document 230 is an HTML document, the annotation instructions 350 may be incorporated as <SPAN> tags within display document 230.

As another example, display document 230 may include an image of the content and a pixel map corresponding to the content. Annotation instructions 350 can include a definition of the annotation region corresponding to pixels within the pixel map, such as a rectangle bounded by four pixels in the pixel map.

According to some embodiments, annotation instructions 350 can include a serialized object that when the deserialized provides the location and type of annotation that client application 175 to render on top of its rendering of display document 230.

According to some embodiments, client application 175 can include one or more user interface elements enabling a user to select content within display document 230. For example, client application 175 can provide a text highlighting tool allowing the user to highlight text within display document 230. Display document 230 may include event listeners that can detect mouse-down events for beginning a highlight and a mouse-up events corresponding to ending the highlight. Once content is selected within display document 230, client application 175 may generate a citation associated with the highlight or annotation. The citations can include the content selected by the user.

In some embodiments, event listeners within display document 230 can provide client application 175 with the corresponding page number in display document 230 as a pin cite for citations 320. For example, if a user highlights the text "I will meet you at 8 o'clock" which is on page fifteen of display document 230, client application 175 may generate a citation with text "I will meet you 8 o'clock," and event listeners within display document 230 may traverse up or down display document 230 to locate the corresponding data element specifying the page number of display document 230 for the citation 320. In addition, client application 175 may provide one or more user interface elements for linking citation 320 to fact 330 and/or issue 340. The fact 330 or issue 340 may be entered by the user in some embodiments.

When client application 175 detects a user action indicating a save of the annotation, client application 175 may send citations 320, facts 330, and issues 340 for the display document 230 back to database 130. In some embodiments, the information contained within citations 320, facts 330, and issues 340 can be used to create annotation instructions 350 when display document 230 is later rendered so that display document 230 renders with its past annotations. In some embodiments, client application 175 may generate annotation instructions and send them database 130 along with citations 320, facts 330, and issues 340.

FIG. 4 illustrates one example of document annotation user interface 400 consistent with disclosed embodiments. Document annotation user interface 400 can include citation pane 410 and document viewer pane 470. According to some embodiments, citation pane 410 can include one or more user interface elements enabling a user to input or edit facts, issues, or citations corresponding to the document displayed in document viewer pane 470. In some embodiments, when a document is loaded in document viewer pane 470, previously stored annotations corresponding to the document are displayed, and fact, issue, and citation information for one of the previously stored annotations may be displayed in citation pane 410. For example, as shown in FIG. 4, document viewer pane 470 includes two annotations—annotation 480 and currently selected annotation 490. As currently selected annotation 490 is selected in document viewer pane 470, citation pane 410 updates to reflect the information corresponding to currently selected annotation 490.

In some embodiments, when document viewer pane 470 detects a user selection of annotation 480, citation pane 410 may update to reflect fact, issue, and citation information associated with annotation 480. Likewise, when document viewer pane 470 detects user actions consistent with a user generating a new annotation, some information (such citation text) in citation pane 410 may auto-populate to assist the user in quickly generating citations, as described below.

In some embodiments, citation pane 410 can include fact text box 415. Fact text box 415 can provide a text input user interface element enabling a user to enter a fact associated with a citation corresponding to an annotation for the document displayed in document viewer pane 470. For example, as shown in FIG. 4, a fact corresponding to how "QuickTalk" sends messages is displayed. Citation pane 410 can also include entity user interface element 420.

Entity user interface element 420 can provide a text input user interface element or other user interface element providing a user functionality to select an existing entity to associate with a citation or annotation, or create a new entity to associate with the citation. Citation pane 410 can also include date user interface element 425, which can include a date chooser user interface element or a text entry user interface element providing date entry functionality. Likewise, citation pane 410 can also include a time entry user interface element 430 enabling a user to specify a time associated with a citation.

According to some embodiments, citation pane 410 can include a pin cite user element 435. Pin cite user element 435 can display a pin cite associated with a citation corresponding to an annotation in the document displayed by document viewer pan 470. In some embodiments, pin cite user element 435 may be auto-populated when a user selects content in document viewer pane 470. For example, as shown in FIG. 4, when a user selects content in a document displayed in document viewer pane 470, such as currently selected annotation 490, event listeners within the display document displayed by document viewer pane 470 may publish or otherwise provide pin cite data to pin cite user element 435. The pin cite data may correspond to the page of the selected content within the display document (e.g., page 12 in the example shown in FIG. 4). Once pin cite user element 435 detects or obtains the pin cite or page number, it may auto populate pin cite user element 435.

Citation pane 410 can also include issues user interface element 440. In some embodiments, issues user interface element 440 can include one or more pill user interface elements 445, which display the issues associated with currently selected annotation 490. Citation pane 410 can also include create new issue element 450, a user interface element enabling a user to create a new issue to associate with currently selected annotation 490.

In some embodiments, citation pane 410 can include source text user interface element 455. Source text user interface element 455 can display the content associated with currently selected annotation 490. For example, as shown FIG. 4, source text user interface element 455 displays the text that has been highlighted in currently selected annotation 490. In some embodiments, the source text user interface element 455 is auto populated when a user generates an annotation for the document displayed in document viewer pane 470.

Citation pane 410 can also include delete button 460 and save button 465. Delete button 460 can enable a user to delete the fact, issue, and citation information for the currently selected annotation, and save button 465 can enable a user to save changes to the fact, issue, and citation information. In some embodiments, when delete button 460 or save button 465 is selected, document annotation user interface 400 may display a confirmation dialog box asking the user to confirm the save or deletion of the fact, issue, and citation information.

Figure 5:
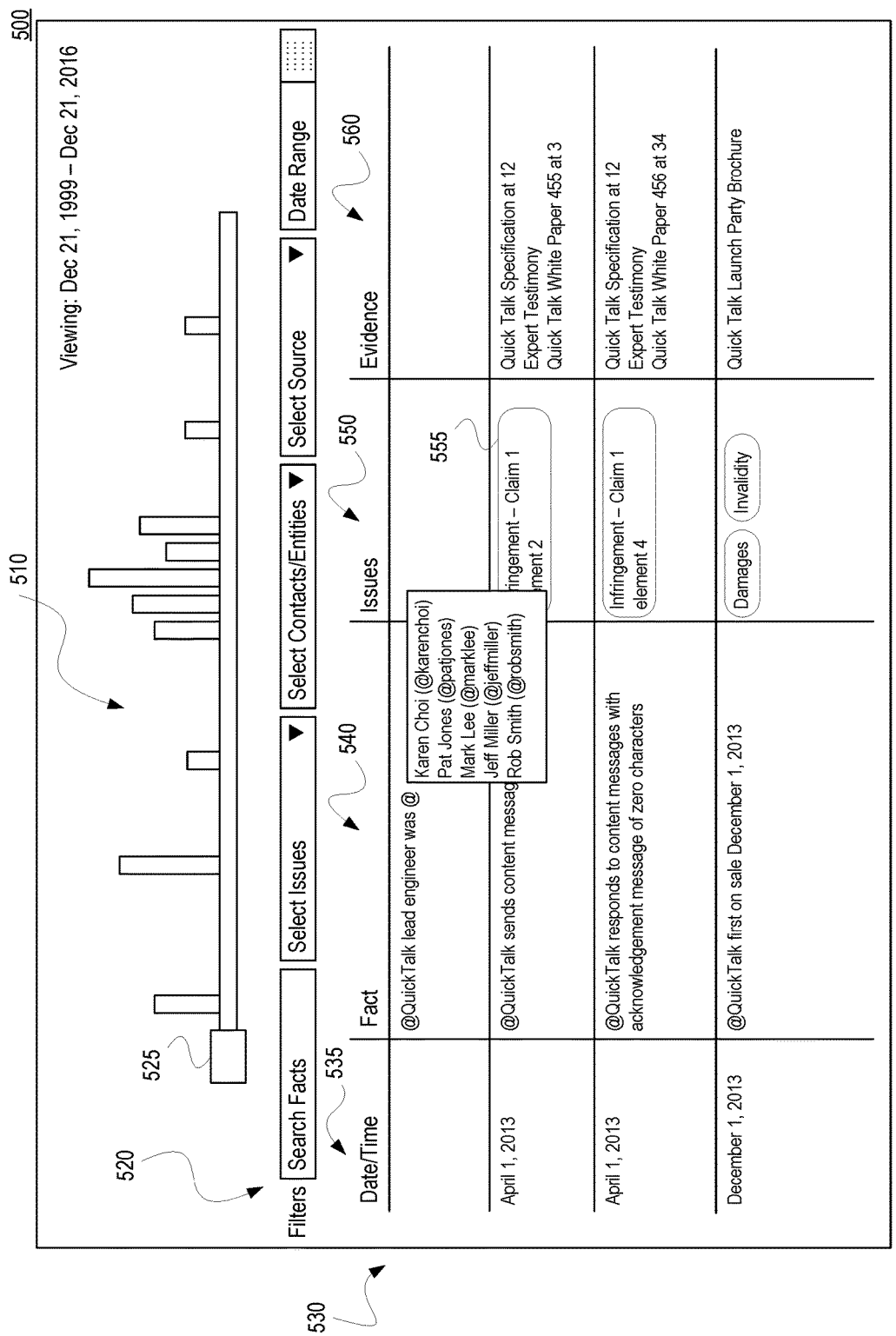
FIG. 5 shows an example timeline user interface consistent with disclosed embodiments.

FIG. 5 illustrates one example of fact view user interface 500 consistent with disclosed embodiments. Fact view user interface 500 includes several user interface elements for displaying facts stored in database 130 of document annotation system 110, issues to which those facts pertain, and citations of supporting evidence for the facts. In some embodiments, such as the example embodiment shown in FIG. 5, facts view user interface 500 includes timeline user interface 510 and fact table 530.

In some embodiments, timeline user interface 510 can include a histogram representing the number of facts stored within document annotation system 110 relevant on a particular date for a date range. The date range shown in the example fact user interface 500 of FIG. 5 is Dec. 21, 1999 to Dec. 21, 2016. The height of each bar of the histogram of timeline user interface 510 represents the number of facts for a point in time. Taller bars represent more facts at the point in time while smaller bars represent less facts at the point in time.

According to some embodiments, timeline user interface 510 shows a histogram of facts by time according to one or more filters set by a user. Filter user interface elements 520 represent the types of filters available to filter facts according to one embodiment. Filter user interface elements 520 can allow a user to search facts based on keywords to select particular issues, select particular contexts or entities, select a source for the facts, or specify particular date range.

In some embodiments, users may filter the date range of facts using slider 525 of timeline user interface 510—when a user slides slider 525 to the right the date range may decrease and when a user slides slider 525 to left the date range may increase. In some embodiments, after a user moves slider 525, timeline user interface 510 may update to show a histogram of facts relevant to the selected date range, and slider 525 may return to a home position at one side of timeline user interface 510. For example, as shown in FIG. 5, slider 525 is at home position all the way to the left of timeline user interface 510.

In some embodiments, users may also filter the date range of facts by selecting one or more of the bars of the histogram. When timeline user interface 510 detects a user selection event at one of the bars in the histogram, fact table 530 may update to show the facts corresponding to the selected bar in the histogram. The date range filter may also update corresponding to the facts of the bar of the histogram, which may be one day (e.g., Dec. 12, 2016) in some cases. Timeline user interface 510 may provide summary information when it detects a mouse over event on each bar the histogram. The summary information may be presented as a pop-up window showing the facts included in the bar.

In some embodiments, fact table 530 includes one or more rows of facts. As noted above, the facts displayed by fact table 530 may correspond to the values of filter user interface elements 520, which may also correspond to the facts supporting the histogram displayed by timeline user interface 510. Fact table 530 may include several columns corresponding to details of the facts displayed by fact table 530 such as date/time column 535, fact description column 540, issues column 550, and evidence column 560. According to some embodiments, the cells of fact table 530 are editable. For example, the cells in fact description column 540 may allow for text entry by a user. In some embodiments, the cells provide auto completion functionality for the user when the user enters text. For example as shown in FIG. 5, when a user enters a symbol representing a reference to an entity or contact (represented by the @ symbol in the embodiment of FIG. 5), fact table 530 may display a list of entities and contacts associated with the case or matter for which document annotation system 110 is storing documents.

In some embodiments, the cells under issues column 550 include pill interface elements representing issues, such as pill interface 555. In some embodiments, a user may add an issue to a cell via a context-sensitive menu (e.g. activated by a right-click), or via user interface elements dedicated for adding issues (not shown in FIG. 5). Likewise, in some embodiments, a user may be able to delete an issue associate with particular fact by selecting the pill interface 555 corresponding to the issue and hitting the delete or backspace key, or by invoking a context-sensitive menu and selecting an action corresponding to a delete.

As mentioned above, fact table 530 can include evidence column 560. Evidence column 560 can include, for each fact in fact table 530, a list of citations supporting that fact. The citations may have been generated based on annotations applied to documents displayed in document annotation user interface 400. According to some embodiments, evidence column 560 may provide pin cite information for citations. The cells under evidence column 560 may be editable allowing a user to modify citations in certain embodiments.

Figure 6:
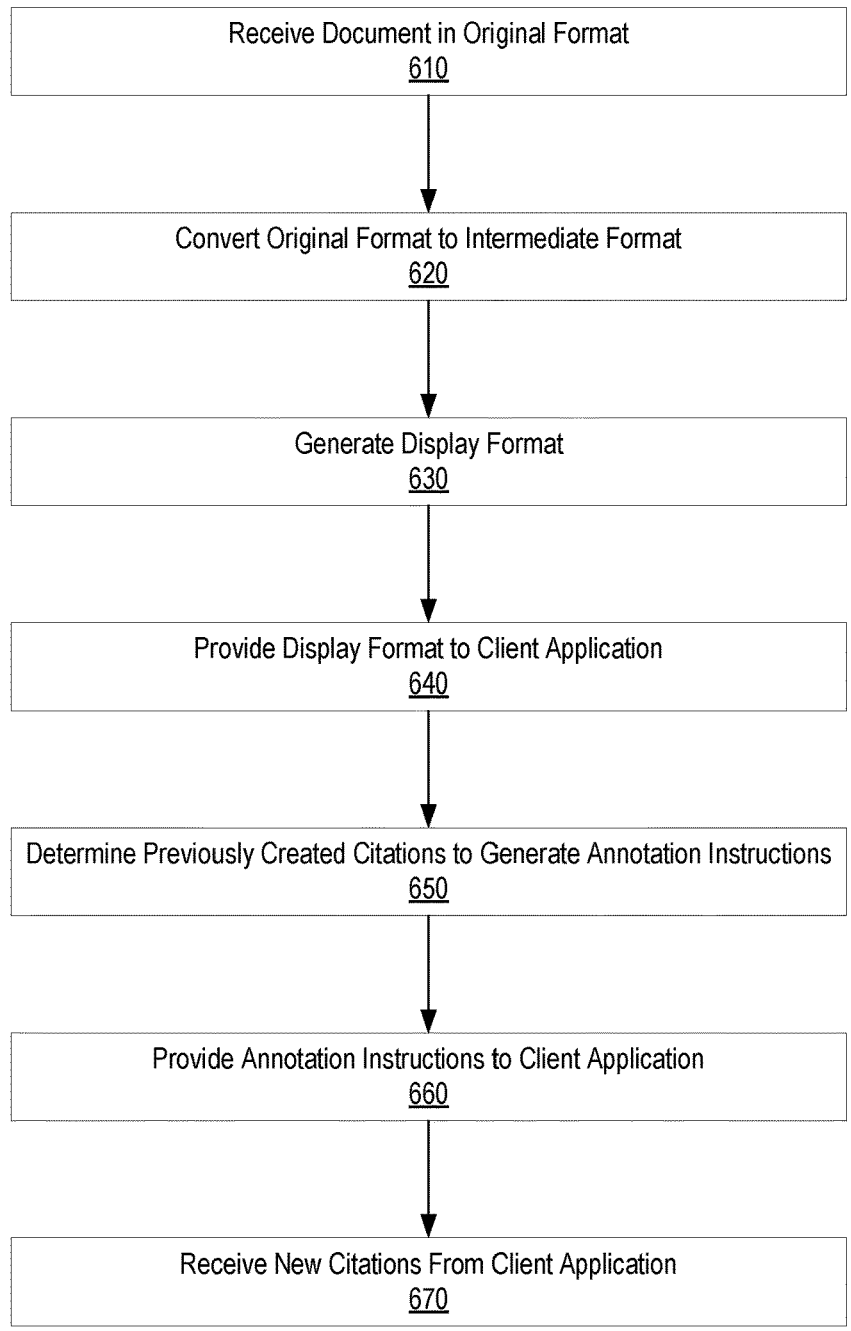
FIG. 6 shows a flow chart for a document annotation process consistent with disclosed embodiments.

FIG. 6 shows a flowchart representing an example document annotation process 600 for obtaining documents, presenting documents, and capturing annotations for documents. According to some embodiments, document annotation process 600 can be performed by one or more components of a document annotation system such as document annotation system 110. Although the following discussion describes document annotation process 600 as being performed by a document annotation system, other components of a computer system configured to obtain, present, and annotate documents can perform process 600 without departing from the spirit and scope of the present disclosure.

A document annotation system begins performance of document annotation process 600 at step 610 where the document annotation system receives a document in an original format. The document may contain content corresponding to facts, issues, or contacts/entities for a case or subject for which the document annotation system is storing and managing documents. The document received at step 610 can include one or more pages. For example the document may be a slide deck of multiple slides were each slide is a page, or the document may be a word processing document or other document having the concept of pages, for example, when printed. In some embodiments, the original format of the document corresponds to the format of the document as it is maintained within the ordinary course of business.

At step 620, the document annotation system may convert the document in original format (or original document) to a document in a common intermediate format (or an intermediate format). According to some embodiments, the intermediate format may include one or more page data elements representing the pagination of the document when in original format. In some embodiments, the one or more page data elements further represent pages of the document when in intermediate format. The intermediate format may be a common intermediate format to which documents of original formats are transformed. For example, the original formats may include image formats (e.g., JPEG, GIF, TIFF, etc.), word processing formats (e.g., .DOC, .DOCS, .WPD, .ODT, .OTT, .TXT, etc.), presentation formats (e.g., .PPT, .KEY, .OPD, .SDA, etc.), spreadsheet formats (e.g., .XLS, .CSV, .SDC, .ODS, .WKS) and other types of formats (e.g., PDF, HTML, XML, source code file types, etc.), and the common intermediate format may be one format. In some embodiments, the common intermediate format can be PDF, and other formats may be used in other embodiments.

The document annotation system may, at step 630, generate a display format for the document using the common intermediate format. The display format can include, in some embodiments, data marker elements that link portions of the content of the document to respective pages of the document. The data marker elements may correlate or be based on the one or more page data elements of the intermediate format. As just one example, the display format may include a document object model that includes nodes where each node corresponds to a page data element of the intermediate format. In some embodiments, portions of content are marked with their respective data marker element corresponding to respective page.

According to some embodiments, the display format includes a default style. The default style can include colors, fonts, and font styles (e.g., italics, underline, bold). The default style can be the same across all documents stored and managed by the document annotation system. In some embodiments, the default style may be different for each document stored and managed by the document annotation system. In such embodiments, the default style may be the same or substantially similar to the style of the document when it original format. For example, if the document includes text content that is black, 12-pt Times New Roman in the original format of the document, then the display format may be black, 12-pt Times New Roman.

The display format can also include one or more event listeners for detecting user inputs indicative of creating annotations for a document. According to some embodiments, the event listeners can include an event listener that detects a first user input action at a start location corresponding to a portion or sub-portion of the content of the document. The first user input action can be, for example a mouse-down or a mouse-pressed event. The event listeners can also include an event listener that detects a second user input action at an end location. The second user input action can be, for example, a mouse-up or mouse-released event.

The event listeners may correspond to event handlers that generate a citation corresponding to the portion or subportion of the content falling within the start location and the end location. In some embodiments, the event handlers determine a pin cite or page location based on the data marker elements within the display format. For example, the event handlers may search the display format for the closest data marker element to determine the value of the pin cite or the page location. In some embodiments, when the display format is a document object model represented as a hierarchical tree, event handlers may traverse the hierarchical tree up until it reaches a node within attribute for a data marker element linking content at that node with a page.

In some embodiments, the display format can include a security data element that can be used to identify a specific instance of a client application for security purposes so that only that instance of the client application may view the document in display format. For example, in some embodiments, client applications configured to read and interpret the display format may be installed with a security token, or unique security key. The security token or key may be included within the display format of documents sent to the client application, and the client application may be configured to render the display format if the security data element matches the security token or security key of the client application.

In some embodiments, the display format may be encrypted using a key that is known by the target client application for the display format. In such embodiments, when a client application receives the document in display format it will attempt to decrypt the display format using its key. If the client application security token or security key matches the key used to encrypt the display format, then the client application will render the display format properly. But, if the client applications security token or security key is different than the key used to encrypt the display format, then the client application will be unsuccessful when attempting to run a display format.

After the document annotation system generates the display format, it may provide the display format to the client application at step 640. In some embodiments, the display format may be provided to the client application responsive to a request received from the client application. In some embodiments, generating the display format (step 630), may be performed responsive to request from the client application to display a particular document, but in other embodiments, generating the display format (step 630) may be performed asynchronously from requests from the client application to display a document.

In some embodiments, the document annotation system may determine previously created citations to generate annotation instructions for documents provided to the client application in display format at step 650. According to some embodiments, the document annotation system may access a database to identify a portion of the content of the document represented in the display format that has been saved as a citation. As noted above, citations can include a pin cite corresponding to a data marker element of the display format which links portions of the content of the display format to respective pages of the intermediate format and/or the original format. In some embodiments, the citation information can include the pin cite information (or data marker element information) and a subportion of the content.

The document annotation system may generate annotation instructions using the citation information by identifying the data marker element of the display format for the annotation based on the pin cite and determining a start and end position of the annotation based on the sub-portion of the content. In some embodiments, the annotation information may be determined using string matching techniques. In other embodiments, the information corresponding to the sub-portion of the content can represent a number of characters, lines or pixels (for example) from the beginning of the page to the beginning of the citation. The annotation instructions likewise include this information so that client application can appropriately annotate documents in user interfaces.

In some embodiments, the annotation instructions may include an annotation style. The annotation style may be saved as part of the citation in the database of the document annotation system. An annotation style can include, for example, a type of annotation such as a highlight or underline, a text or font effect, different colors, or other style modifiers capable of presenting a visual cue to users so that users are aware that content has been annotated. The annotation style can be different than the default style for some embodiments.

At step 660, the document annotation system can provide the annotation instructions to the client application. After a user modifies or adds citations to a document, the client application may send the citations to the document annotation system and the document annotation system may receive the citations at step 670. Once the citations are received, the document annotation system may store them in a database for future reference.

Figure 7:
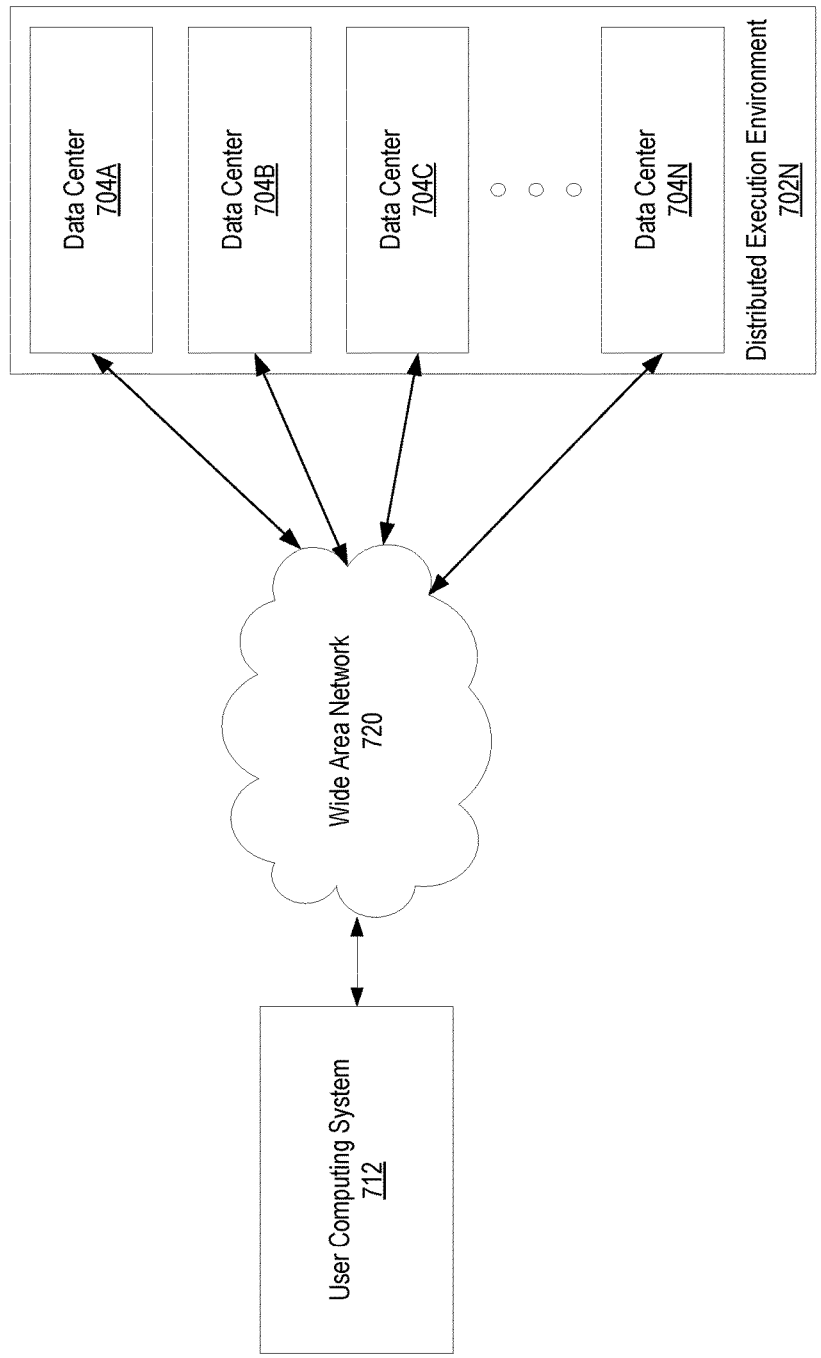
FIG. 7 is a system and network diagram showing an illustrative distributed execution environment consistent with disclosed embodiments.

FIG. 7 and the following description are intended to provide a brief, general description of a suitable computing environment in which the disclosed embodiments can be implemented. In particular, FIG. 7 is a system and network diagram that shows an illustrative operating environment that includes distributed execution environment 702. In some implementations, distributed execution environment 702 can provide instances of computing resources on a permanent or an as-needed basis.

The instances of computing resources provided by distributed execution environment 702 may include various types of resources, such as data processing resources, data storage resources, networking resources, data communication resources, and the like. Each type of computing resource may be general-purpose or may be available in a number of specific configurations. For example, and as discussed briefly above, instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

As also mentioned above, the instances of computing resources provided by distributed execution environment 702 are enabled in one implementation by one or more data centers 704A-704N (which may be referred to herein singularly as "data center 704" or collectively as "data centers 704"). Data centers 704 are facilities utilized to house and operate computer systems and associated components. Data centers 704 typically include redundant and backup power, communications, cooling, and security systems. Data centers 704 might also be located in geographically disparate locations. One illustrative configuration for data center 704 that may be utilized to implement the concepts and technologies disclosed herein for document annotation in a distributed execution environment 702 will be described below with regard to FIG. 8.

Users of distributed execution environment 702 may access the computing resources provided by data centers 704 over a suitable data communications network, such as a Wide Area Network ("WAN") 720. Although a WAN 720 is illustrated in FIG. 7, it should be appreciated that a local-area network ("LAN"), the Internet, or any other networking topology known in the art that connects data centers 704 to user computing devices 712 (which may be user computer system 170 in some embodiments) may be utilized. It should also be appreciated that combinations of such networks might also be utilized.

Figure 8:
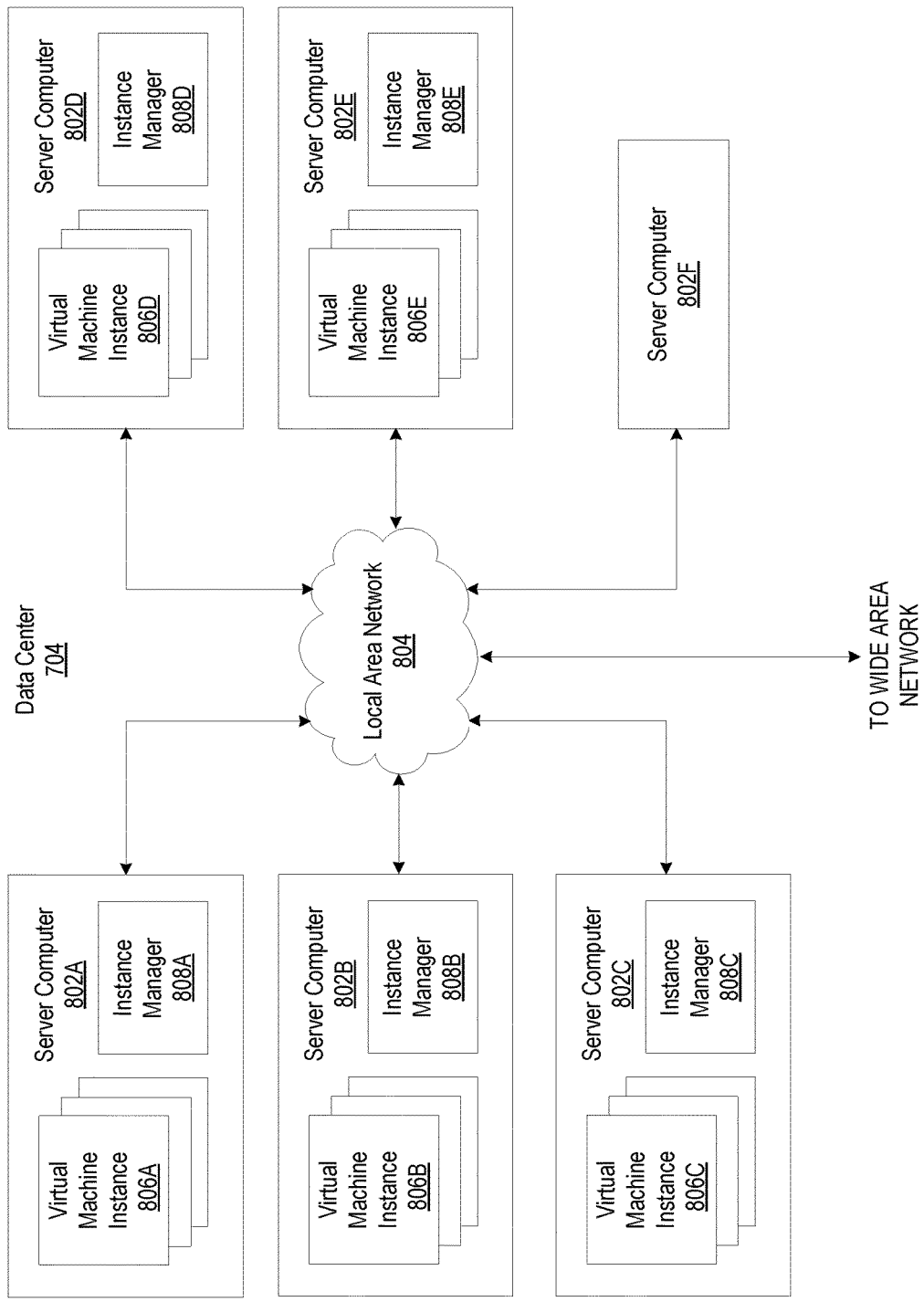
FIG. 8 is a computing system diagram that showing one configuration for a data center implementing aspects of disclosed embodiments.

FIG. 8 is a computing system diagram that illustrates one configuration for data center 704 that implements a distributed execution environment 702, including the concepts and technologies disclosed herein for performing document annotation. The example data center 704 shown in FIG. 8 includes several server computers 802A-802F (which may be referred to herein singularly as "server computer 802" or in the plural as "server computers 802"). As mentioned briefly above, server computers 802 may be standard tower or rack-mount server computers configured appropriately for providing the computing resources described herein. For example, in one implementation server computers 802 are configured to provide virtual machine instances 806A-806E.

A virtual machine instance can be an instance of a software implementation of a machine (e.g., a computer) that executes programs like a physical machine. Each of servers 802 may be configured to execute an instance manager 808 capable of instantiating and managing virtual machine instances 806. Instance manager 808 might be a hypervisor or another type of program configured to enable the execution of multiple virtual machine instances 806 on a single server 802, for example. In some embodiments, data center 704 shown in FIG. 8 can include server computer 802F that is reserved for executing software components for managing the operation of data center 704, server computers 804, virtual machine instances 806, and other resources within distributed execution environment 702.

It should be appreciated that although the embodiments disclosed herein are described primarily in the context of virtual machine instances 806, other types of instances of computing resources can be utilized with the concepts and technologies disclosed herein. For instance, the technologies disclosed herein might be utilized with instances of hardware resources, instances of data storage resources, instances of data communications resources, instances of networking resources, instances of database resources, and with other types of instances of computing resources.

In the example data center 704 shown in FIG. 8, local area network ("LAN") 804 can be utilized to interconnect server computers 802A-802E and server computer 802F. LAN 804 can also be connected to WAN 702 illustrated in FIG. 7. It should be appreciated that the configuration and network topology illustrated in FIGS. 7 and 8 has been greatly simplified and that many more computing systems, networks, and networking devices may be utilized to interconnect the various computing systems disclosed herein. Appropriate load balancing devices or software modules might also be utilized for balancing a load between each of data centers 704A-704N, between each of the server computers 802A-802F in each data center 704, and between virtual machine instances 806 provided by the server computers 802A-802F.

It should be appreciated that the data center 704 described in FIG. 8 is merely illustrative and that other implementations might be utilized. In particular, functionality described herein as being performed by conversion service 115, document collection service 120, and/or user interface service 125 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 9:
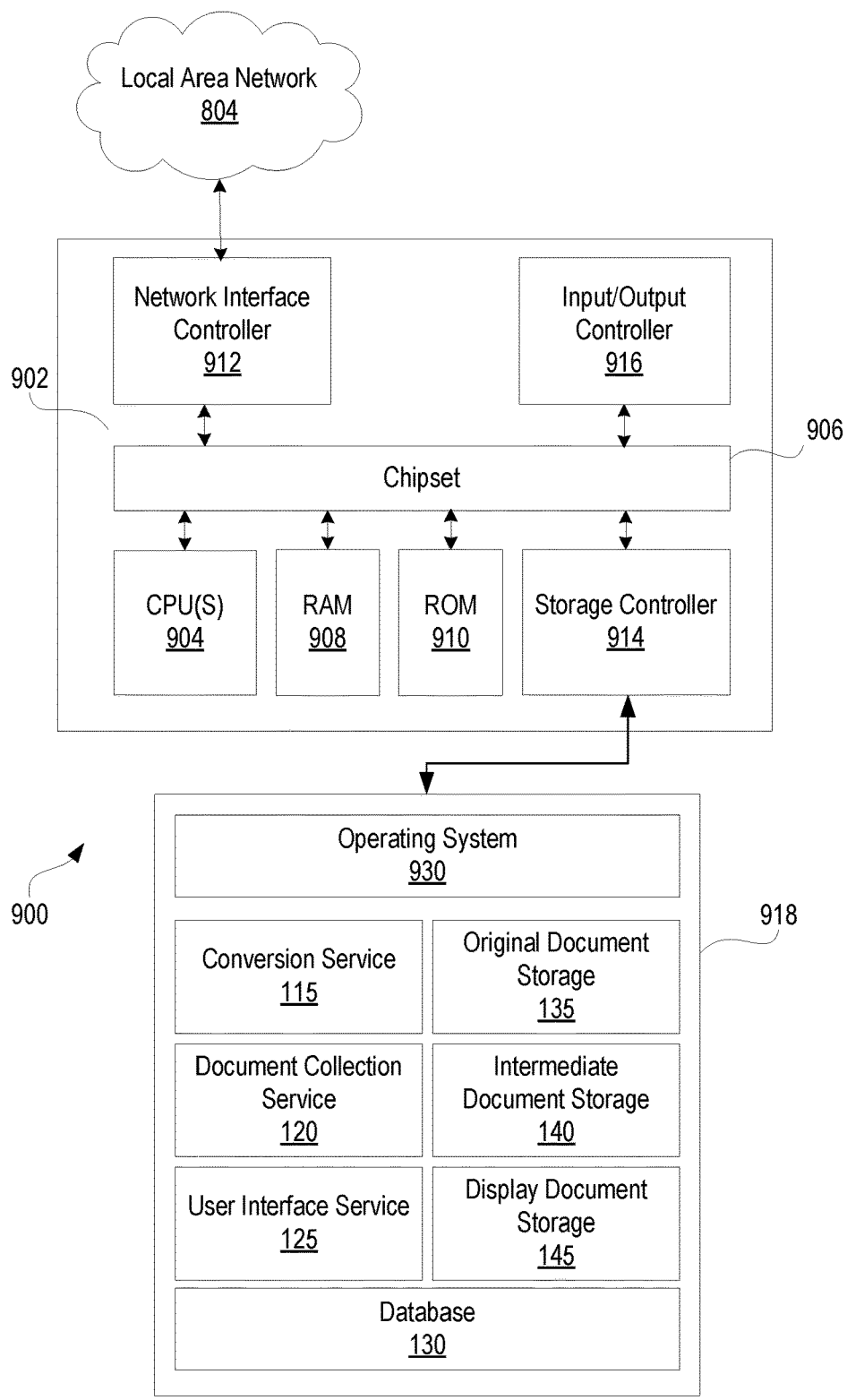
FIG. 9 is a computer architecture diagram showing one illustrative computer hardware architecture for implementing aspects of disclosed embodiments.

FIG. 9 shows an example computer architecture for a computer 900 capable of executing the program components described above for performing actions for document annotation in a distributed execution environment 102 or in a non-distributed execution environment as described below. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing on user computing system 170, document annotation system 110 within the data centers 704A-704N on the server computers 802A-802F, document annotation system 110 executing in a non-distributed execution environment, or on any other computing system mentioned herein.

Computer 900 includes baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with chipset 906. CPUs 904 may be standard programmable processors that perform arithmetic and logical operations necessary for the operation of the computer 900.

CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

Chipset 906 provides an interface between CPUs 904 and the remainder of the components and devices on baseboard 902. Chipset 906 may provide an interface to a random access memory ("RAM") 908, used as the main memory in computer 900. Chipset 906 may further provide an interface to a computer-readable storage medium such as read-only memory ("ROM") 910 or non-volatile RAM ("NVRAM") for storing basic routines that help to startup computer 900 and to transfer information between the various components and devices. ROM 910 or NVRAM may also store other software components necessary for the operation of computer 900 in accordance with the embodiments described herein.

Computer 900 may operate in a networked environment using logical connections to remote computing devices and computer systems through a network, such as local area network 804. Chipset 906 may include functionality for providing network connectivity through NIC 912, such as a gigabit Ethernet adapter. NIC 912 is capable of connecting computer 900 to other computing devices over network 804. It should be appreciated that multiple NICs 912 may be present in computer 900, connecting the computer to other types of networks and remote computer systems.

Computer 900 may be connected to mass storage device 918 that provides non-volatile storage for the computer. Mass storage device 918 may store system programs, application programs, other program modules, and data, which have been described in greater detail herein. Mass storage device 918 may be connected to computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether mass storage device 918 is characterized as primary or secondary storage, and the like.

For example, computer 900 may store information to mass storage device 918 by issuing instructions through storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of disclosed embodiments, with the foregoing examples provided only to facilitate description. Computer 900 may further read information from mass storage device 918 by detecting the physical states or characteristics of one or more particular locations within the physical storage units.

In addition to mass storage device 918 described above, computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Mass storage device 918 may store operating system 930 utilized to control the operation of computer 900. According to one embodiment, the operating system comprises the LINUX operating system. According to another embodiment, the operating system comprises the WINDOWS®

SERVER operating system from MICROSOFT Corporation. According to further embodiments, the operating system may comprise the UNIX or MAC OS operating systems. It should be appreciated that other operating systems may also be utilized. Mass storage device 918 may store other system or application programs and data utilized by computer 900, such as conversion service 115, document collection service 120, user interface service 125, database 130, original document storage 135, intermediate document storage 140, and/or display document storage 145 or any of the other software components and data described above. Mass storage device 918 might also store other programs and data not specifically identified herein.

In one embodiment, mass storage device 918 or other computer-readable storage media is encoded with computer-executable instructions which, when loaded into computer 900, transforms the computer from a general-purpose computing system into a special-purpose computer capable of implementing the embodiments described herein. These computer-executable instructions transform computer 900 by specifying how CPUs 904 transition between states, as described above. According to one embodiment, computer 900 has access to computer-readable storage media storing computer-executable instructions which, when executed by the computer 900, perform the various routines and processes described with respect to disclosed embodiments.

Computer 900 may also include one or more input/output controllers 916 for receiving and processing input from a number of input devices, such as a keyboard, a mouse, a touchpad, a touch screen, an electronic stylus, or other type of input device. Input/output controllers 916 might also receive input from a digital camera and/or video camera, a GPS sensor, a compass, a gyroscope, or another type of sensor utilized to determine the location and/or the orientation of computer 900. Input/output controller 916 might also be connected to one or more wireless radios for facilitating wireless communication with computer 900.

Input/output controller 916 might also provide output to a display, such as a computer monitor, a flat-panel display, a digital projector, a printer, a plotter, or other type of output device. It will be appreciated that computer 900 may not include all of the components shown in FIG. 9, may include other components that are not explicitly shown in FIG. 9, or may utilize an architecture completely different than that shown in FIG. 9. For example, computer 900 might be implemented utilizing system on a chip ("SOC") technologies and other types of technologies suitable for use in implementing smartphones, tablet computing devices, and other types of mobile computing devices.

Based on the foregoing, it should be appreciated that technologies for performing document annotation within a distributed execution environment or a non-distributed execution environment have been presented. Moreover, although the subject matter presented has been described in language specific to computer structural features, methodological acts, and computer readable media, it is to be understood that the appended claims are not necessarily limited to the described specific features, acts, or media. Rather, the specific features, acts, and mediums are disclosed as example implementations.

The subject matter described above is provided by way of illustration only and should not be construed as limiting. Furthermore, the claimed subject matter is not limited to implementations that solve any or all disadvantages noted in any part of this disclosure. Various modifications and changes may be made to the described subject matter described without following the example embodiments and applications illustrated and described, and without departing from the true spirit and scope of the disclosed embodiments. For example, features and functionality described with respect to one embodiment may be included in other disclosed embodiments, even though the above detailed description does not explicitly describe the other disclosed embodiments as including such features and functionality.

What is claimed is:

1. A method for processing and annotating documents, the method comprising:
receiving a first document including content, the first document stored in an original format;
generating a second document including the content, the second document stored in an intermediate format, the intermediate format including one or more page data elements representing pagination of the content within the second document, wherein the original format and the intermediate format differ;
generating a third document including the content, the third document stored in a display format differing from the original format and the intermediate format, the display format including:
data marker elements linking the content to respective pages based on the one or more page data elements, and
a default style for rendering the content within a user interface;
providing the third document to a client application;
determining, based on the data marker elements, one or more pin cites indicating at least one page number;
providing, to the client application, instructions for applying an annotation to the third document, the instructions including an identification of a portion of the content to render using an annotation style, wherein the annotation style and the default style differ, and wherein the identification of the portion of the content to render using the annotation style includes one of the one or more pin cites associated with the portion of the content;
providing, to the client application, contextual data pertaining to the portion of the content providing, to the client application, fact capturing instructions that cause the client application to render a fact entry user interface element;
receiving, via the fact entry user interface element, fact data associated with at least the portion of the content; and
generating a fact view user interface including:
a timeline view of one or more facts associated with a date range, the one or more facts comprising at least a portion of the fact data; and
a table view of the one or more facts.

2. The method of claim 1 wherein the identification of the portion of the content to render using the annotation style includes a start location for applying the annotation style.

3. The method of claim 1 further comprising providing, to the client application, text corresponding to the annotation.

4. The method of claim 1, wherein the display format includes event listeners for detecting a user input event at a location within the third document.

5. The method of claim 4, wherein the user input event generates a citation corresponding to another portion of the content.

6. The method of claim 5, wherein the citation includes an identification of one of the data marker elements, the one of the data marker elements corresponding to the location.

7. A document annotation system comprising:
one or more processors;
computer readable media storing instructions that when executed by the one or more processors perform operations comprising:
receiving a document including content, the document stored in an original format;
converting the document to an intermediate format, the intermediate format including one or more page data elements representing pagination of the content within the document, wherein the original format and the intermediate format differ;
converting the document in the intermediate format to a display format, the display format differing from the original format and the intermediate format, the display format including:
data marker elements linking one or more portions of the content to respective pin cites based on the one or more page data elements, and
code for creating one or more event listeners within the document in the display format, the code causing the one or more event listeners to:
detect a first user action at a start location within the one or more portions of the content,
detect a second user action at an end location within the one or more portions of the content, and
generate a citation including a reference to the document and citation content, the citation content including a selected subportion of the one or more portions of the content indicated by the start location and the end location, wherein the reference to the document includes the respective pin cites linked by the data marker elements to the selected subportion;
providing, to a client application, the document in the display format;
providing fact capturing instructions to the client application, the fact capturing instructions causing the client application to render a fact entry user interface element;
receiving, via the fact entry user interface element, fact data associated with at least the selected subportion; and
providing fact view instructions causing the client application to render a fact view user interface including:
a timeline view of one or more facts associated with a date range; and
a table view of the one or more facts.

8. The document annotation system of claim 7, wherein the instructions, when executed by the one or more processors cause the one or more processors to further perform operations including providing, to the client application, annotation instructions for applying an annotation to the display format of the document.

9. The document annotation system of claim 8, wherein the annotation corresponds to a previously generated citation.

10. The document annotation system of claim 8, wherein the display format includes a default style for rendering content, and the annotation is rendered in an annotation style, the annotation style different than the default style.

11. The document annotation system of claim 7, wherein the timeline view includes a histogram representing the one or more facts associated with the date range.

12. The document annotation system of claim 7, wherein the fact capturing instructions further cause the client application to transmit data present in the fact entry user interface element.

13. The document annotation system of claim 7, wherein the client application executes on a remote user device.

14. The document annotation system of claim 7, wherein the instructions, when executed by the one or more processors cause the one or more processors to further perform operations including providing source text population instructions, the source text population instructions causing the client application to render a source text user interface element.

15. The document annotation system of claim 14, wherein the source text population instructions cause the source text user interface element to render the selected subportion of the one or more portions of the content.

16. A distributed computing system comprising:
a user computing device comprising:
one or more first processors, and
first computer readable media storing first instructions that when executed by the one or more first processors perform first operations comprising:
receiving user interface code for displaying a document in a display format in a user interface, the display format including:
data marker elements linking content of the document to respective pages of an original format based on one or more page data elements, and
a default style for rendering the content within the user interface; and
rendering the user interface according to the user interface code; and
a document annotation system comprising:
one or more second processors,
second computer readable media storing second instructions that when executed by the one or more first processors perform first operations comprising:
receiving the document in the original format, wherein the original format and the display format differ;
converting the original format to an intermediate format, the intermediate format including one or more page data elements representing pagination of the content within the document;
generating the display format;
providing the user interface code and the document in display format to a client application;
determining, based on the data marker elements, one or more pin cites indicating at least one page number;
providing, to the client application, annotation instructions for applying an annotation to the document in display format, the annotation instructions including an identification of a portion of the content to render using an annotation style, wherein the annotation style and the default style differ, the identification including one of the one or more pin cites associated with the portion of the content;
providing, to the client application, contextual data associated with the portion of the content;
providing, to the client application, fact capturing instructions that cause the client application to render a fact entry user interface element;

receiving, via the fact entry user interface element, fact data associated with at least the portion of the content; and generating a fact view user interface including:
- a timeline view of one or more facts associated with a date range; and
- a table view of the one or more facts.

17. The distributed computing system of claim 16, wherein the user interface includes a fact entry user interface element and wherein the first instructions when executed by the one or more first processors further cause the one or more first processors to transmit data present in the fact entry user interface element to the document annotation system.

18. The distributed computing system of claim 17, wherein the user interface code:
- creates one or more event listeners that are linked to a portion of the content within the document in the display format, the user interface code causing the one or more event listeners to:
  - detect a first user action at a start location within the portion of the content;
  - detect a second user action at an end location within the portion of the content; and
  - generate a citation including a subportion of the portion of the content.

19. The distributed computing system of claim 18, wherein the user interface includes a source text user interface element and wherein the first instructions when executed by the one or more first processors further cause the one or more first processors to render the subportion of the portion of the content.

20. The distributed computing system of claim 16, wherein the contextual data comprises entity data indicating at least one of a person or an organization associated with the document.

* * * * *